Oct. 27, 1942.  H. W. LINDSAY  2,300,387
ROAD MACHINE
Filed July 27, 1940  3 Sheets-Sheet 2

Fig. 2

Inventor
H. W. Lindsay
by
Attorney

Oct. 27, 1942.        H. W. LINDSAY        2,300,387
ROAD MACHINE
Filed July 27, 1940        3 Sheets-Sheet 3

Patented Oct. 27, 1942

2,300,387

UNITED STATES PATENT OFFICE 2,300,387

ROAD MACHINE

Horace W. Lindsay, La Porte, Ind., assignor to Allis-Chalmers Manufacturing Company, Milwaukee, Wis., a corporation of Delaware Application July 27, 1940, Serial No. 347,851

11 Claims. (Cl. 280—87)

The invention relates to vehicles of the type having steerable or otherwise adjustable running gear, and it is concerned with an improved mounting of such running gear and its adjusting mechanism on the vehicle.

It is an object of the invention to provide an improved vehicle front assembly, the improvements relating more specifically to the construction of a support on which an axle may be mounted and by means of which a frame or body structure of the vehicle may be sustained on said axle; further to a mechanism for adjusting a ground wheel, or a pair of ground wheels, on said axle; and to a relative arrangement of said mechanism and support, which affords protection of said mechanism against injury and facilitates installation of said mechanism on and its removal from said support.

Another object of the invention is to provide a motor grader which has a propelling unit comprising the motor, drive mechanism, rear axle structure and propelling wheels of a standard tractor; in which the blade is placed under the propelling unit as a relatively short distance in advance of the propelling wheels; in which the front wheels are spaced forwardly from the blade a sufficient distance to afford ample clearance for dirt piling up in front of the blade and for horizontal angular adjustment of the blade; and in which motor grader the front wheels are arranged at a distance from the rear wheels greater than the normal spacing of the front wheels of the standard tractor from said rear wheels; the wheel base of the motor grader being longer than the wheel base of the standard tractor, but the increase of the wheel base being relatively small so that the grader may be maneuvered with about the same facility as the standard tractor when equipped with its regular steering truck.

Another object of the invention is to provide an attachment for converting a standard tractor having side channels and a steering truck mounted therebetween, into a grader, the attachment comprising an adapter connectable with the side channels of the tractor in lieu of said steering truck.

A still further object of the invention is to provide a self-propelled road machine which is simple and compact in construction, efficient in operation, and which may be manufactured at relatively low costs.

The foregoing and other objects and advantages of the invention and the operation of a machine constructed in accordance therewith will be apparent from the following description of a preferred embodiment of the invention shown in the drawings accompanying and forming part of this specification. Referring to the drawings:

Fig. 9 is a fragmentary enlarged section on line IX—IX of Fig. 2;

Figures 1, 3, 6:
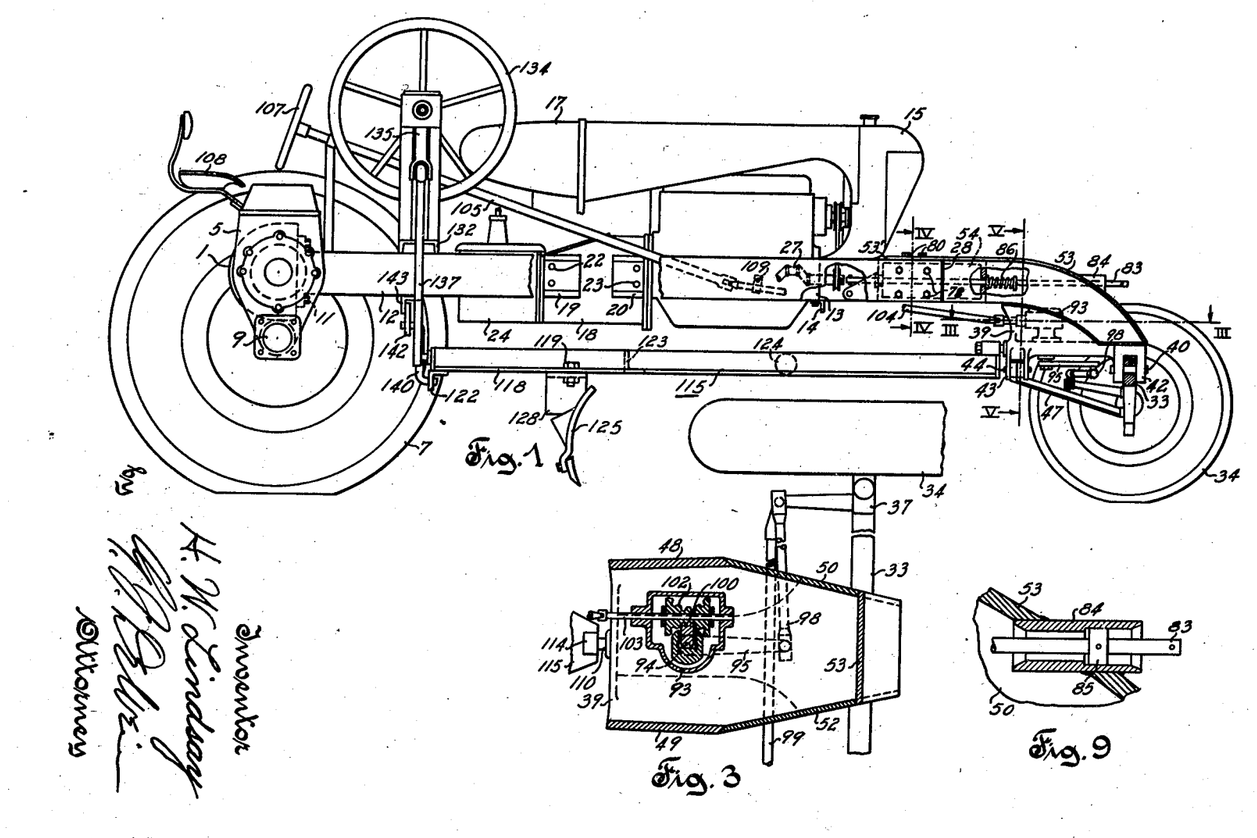
Fig. 1 is a side view of a motor grader, the near front and rear wheels being omitted and frame portions being broken away for purposes of disclosure.
Fig. 3 is an enlarged sectional view on line III—III of Fig. 1.
Figs. 6 and 7 are detail top and side views, respectively, of a filler block forming part of the adapter.
Figure 2:
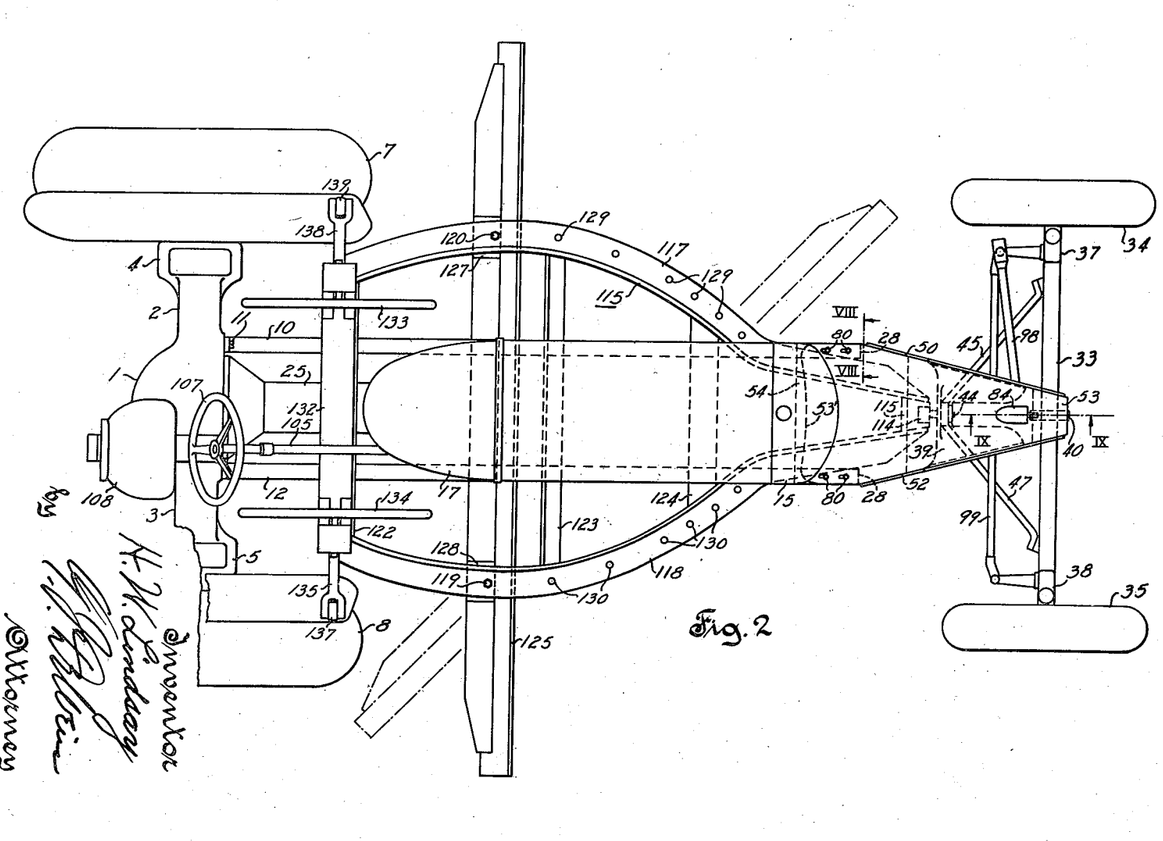
Fig. 2 is a top view of the motor grader shown in Fig. 1.

In Figs. 1 and 2 the upwardly arched rear axle structure of a standard tractor is conventionally shown as comprising a differential housing 1, hollow transverse arms 2 and 3 extending in opposite directions from the housing 1, which arms enclose the usual differential drive shafts, and depending end portions 4 and 5 at the outer ends, respectively, of the arms 2 and 3. Traction wheels 7 and 8 are mounted on the depending end portions 4 and 5, respectively, of the rear axle structure, the depending end portion 5 having a stub axle 9 for the wheel 8, and the end portion 4 having a similar stub axis, in alinement with the stub axle 9, for the wheel 7.

Figures 4, 5, 6, 7, 8:
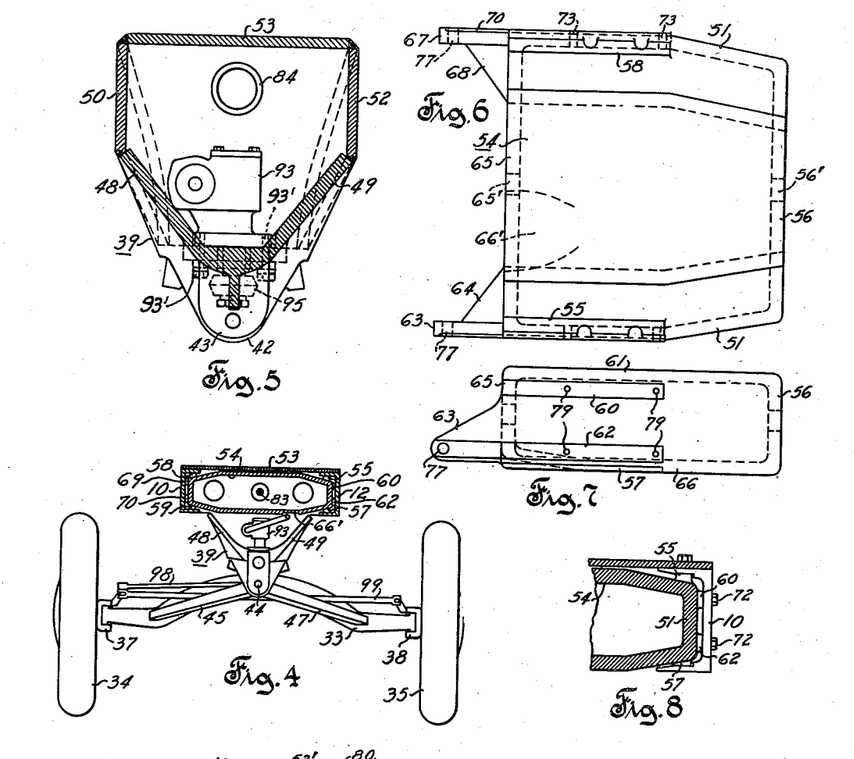
Fig. 4 is a section on line IV—IV of Fig. 1.
Fig. 5 is an enlarged sectional view of the adapter, the section being taken on line V—V of Fig. 1.
Fig. 8 is a fragmentary section on line VIII—VIII of Fig. 2.

Rigidly secured to the arched rear axle structure at transversely spaced upper portions thereof are two side frame members or side beams 10 and 12 in the form of channel irons, each channel iron being upset at its rear end to form upper and lower fastening lugs thereon which are bolted to the front face of the differential housing 1, as shown at 11 in Fig. 2. The left channel iron 10 has a vertical web and transverse top and bottom flanges, as best shown in Fig. 8, the top and bottom flanges extending inwardly from the web, that is, towards a central longitudinal plane at right angles to the axis of the rear wheels 7 and 8. The right channel iron 12 is a duplicate of the channel iron 10, but is reversed relative thereto so that its open side between its top and bottom flanges faces inwardly towards the mentioned plane longitudinally of the machine. The channel irons 10 and 12 extend parallel to each other, throughout their lengths in a forward direction from the rear axle structure, and, like the rear axle structure and the rear wheels 7 and 8, they are part of a standard tractor.

A power plant, which also forms part of the standard tractor, is mounted on the side channels forwardly of the rear axle structure, and comprises an internal combustion engine together with its accessories such as a radiator and a fuel tank. The cylinder block 13 of the internal combustion engine is supportingly connected at its forward end with a transverse angle iron 14 which is secured to the lower flanges of the side channels 10 and 12, and a radiator enclosed within a shell 15, and a fuel tank 17 are mounted in a conventional manner in proximity to the cylinder block 13. A flywheel and clutch housing 18 is rigidly secured to the rear end of the motor block and has lateral mounting lugs 19 and 20 for connection with the side channels 10 and 12. The mounting lugs 19 and 20 at the right side of the housing 18 are fitted into the side channel 12, each mounting lug having horizontal top and bottom faces which are vertically spaced to closely fit between machined surface portions at the relatively opposed sides of the top and bottom flanges of the side channel 12, and each mounting lug 19 and 20 has a vertical outer surface abutting the adjacent inner surface of the web of the channel 12. Tapped holes 22 in the mounting lug 19 and tapped holes 23 in the mounting lug 20 register with holes (not shown) in the web of the side channel 12, and bolts (not shown) extending through the holes in the web of the side channel 12 are screwed into the tapped holes 22 and 23 to secure the housing 18 to the side channel 12. The same construction which has just been described for connecting the housing 18 to the right side channel 12 is employed for connecting the housing 18 to the left side channel 10; that is, the housing 18 has a pair of mounting lugs at its left side, corresponding to the mounting lugs 19 and 20, which are closely fitted between machined surface portions at the relatively opposed sides of the top and bottom flanges of the side channel 10, and the web of the channel iron 10 is drawn up against vertical side surfaces of the left mounting lugs at the housing 18 by means of bolts corresponding to those which secure the right channel iron 12 to the mounting lugs 19 and 20 at the right side of the housing 18. The cylinder block 13 and the housing 18 form a rigid unit, and it will be seen that this unit is retained in a fixed position between the side channels 10 and 12 by the angle iron 14 which supports the cylinder block at its forward end, and by the described lateral connections between the housing 18 and the side channels 10 and 12. A change speed transmission housing 24 in rear of the flywheel and clutch housing 18 is bolted to the rear of the latter in the space between the side channels 10 and 12, and a longitudinally disposed drive shaft casing 25 has a forward connection with the transmission housing 24 and is secured at its rear end to the differential housing 1.

The usual mechanisms for transmitting power from the crankshaft 27 of the internal combustion engine to the traction wheels 7 and 8 are employed and include a master clutch in the housing 18, change speed transmission gearing in the housing 24, a propeller shaft in the casing 25, differential gearing in the housing 1, and final drive gearing enclosed in casings formed at the depending portions 4 and 5 of the rear axle structure.

Figures 10, 12:
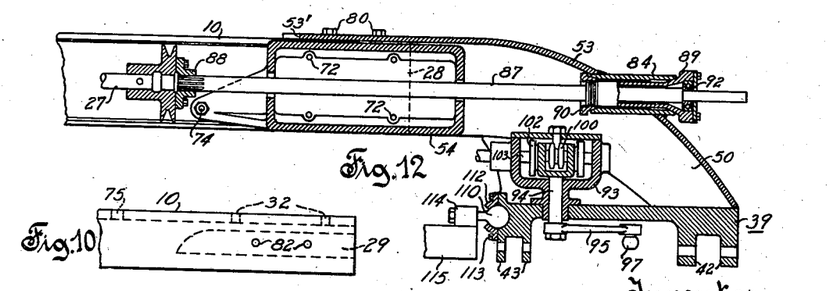
Figs. 10 and 11 are enlarged top and side views, respectively, of a frame detail of the motor grader shown in Figs. 1 and 2.
Fig. 12 is an enlarged sectional view of the adapter and associated parts, including a power takeoff shaft, the section being taken on line IX—IX of Fig. 2.
Figure 11:
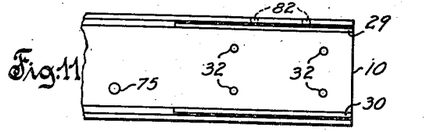

The side channels 10 and 12 extend forwardly from the rear axle structure beyond the cylinder block 13 at opposite sides of the latter, and terminate at 28 a relatively short distance in advance of the bottom of the radiator shell 15, the forward end face of each channel being formed by a square cut at right angles to its web and flanges. Figs. 10 and 11 are enlarged top and side views, respectively, of the forward end of the left channel iron 10, and Fig. 8 shows an end view of the channel, looking from front to rear. It will be noted from these figures that the top and bottom flanges of the channel iron are machined at their relatively opposed surfaces, some of the metal at the bottom side of the top flange and at the top side of the bottom flange being milled out to form parallel surface portions 29 and 30 at right angles to the web of the channel. The machined surface portions 29 and 30 extend rearwardly from the front edges of the top and and bottom flanges and they are of substantially the same length, longitudinally of the channel, as the portion of the channel which projects forwardly beyond the radiator shell 15. The web of the channel has four holes 32 which are drilled into the portion of the web which extends between the machine flange portions. The forward end of the side channel 12 is machined and drilled in the same manner as has just been described in connection with the side channel 10.

Reference is here made to United States Patent 2,073,613, March 16, 1937, C. E. Frudden and W. F. Strehlow, Motor vehicle, which shows a tractor of standard design in which an upwardly arched rear axle structure, side channels, power plant and drive mechanism are assembled in substantially the same manner as has been described hereinbefore, and which patent also shows the described machining and drilling of the front ends of the channels. As explained in the mentioned patent the forward ends of the side channels are machined and drilled in the described manner for the purpose of mounting a steering truck therebetween in an accurately fixed position, and the side channels of the tractor which are sustained at their rear ends on the arched rear axle structure are sustained at their forward ends on the steering truck so that they extend in a horizontal direction at a substantial distance from the ground. The steering truck disclosed in the mentioned patent has side portions which accurately fit between the machined surface portions of the upper and lower flanges of the channels, and the transverse width of the steering truck is such that it closely fits between the vertical webs of the side channels. The holes 32 in the webs of the channels which are shown in Figs. 10 and 11 of the accompanying drawings are the same holes which in the standard tractor receive bolts for securing the steering truck to the side channels, as shown in the mentioned Patent 2,073,613.

The described assembly of the rear axle structure, side channels, power plant and drive mechanism, which, as indicated, is the same as in a standard tractor, forms the propelling unit of the present motor grader. In order to sustain the side channels in a horizontal position at a substantial distance from the ground, as in the standard tractor, a wheeled front support of novel construction is connected to the side channels in lieu of the steering truck of the standard tractor. Referring more specifically to the construction of the substitute front support, which is shown in the accompanying drawings, the following is to be noted.

A pair of front wheels 34 and 35 which are axially spaced from each other a slightly shorter distance than the rear wheels 7 and 8 are steerably mounted in a conventional manner on a front axle 33 by means of steering knuckles 37 and 38, respectively. A casting 39 which forms the base of a rigid adapter for connecting the wheeled front axle 33 with the propelling unit is pivotally connected with the axle 33 by means of a pivot pin 40, the casting 39 having a pair of depending lugs 42 which straddle the axle 33 in the middle between its ends, and the pin 40 extending through the lugs 42 and the axle 33 at right angles to the latter. The lugs 42 depend from a horizontal bottom wall of the casting 39 at the forward end of the latter, and another pair of lugs 43 depend from said bottom wall at the rear end of the casting 39. A pivot pin 44 is mounted in the lugs 43 in axial alinement with the pivot pin 40, the pin 44 serving to pivotally connect a pair of radius rods 45 and 47 with the casting 39 at a rearward portion of the latter. The radius rods 45 and 47 diverge in a forward direction, as shown in Fig. 2, and are rigidly secured at their forward ends to the axle 33 at substantial distances in opposite directions from the pivot pin 40. It will be noted that the described construction permits rocking movement of the axle 33 relative to the casting 39 about the common horizontal axis of the pivot pins 40 and 44, and that the radius rods 45 and 47 guide the axle 33 in a vertical plane at right angles to said axis.

Referring to Figs. 4 and 5 which show an end view of the casting 39 and a cross-section thereof, looking from rear to front, it will be noted that the casting has two side walls 48 and 49 which rise in upwardly diverging directions from the bottom wall of the casting and, as may be seen from Fig. 2, the side walls 48 and 49 also diverge rearwardly at opposite sides of a vertical plane through the common axis of the pivot pins 40 and 44. The upper edges of the side walls are curved as shown in Fig. 1, and merge with the bottom of the casting some distance rearwardly from its front edge.

The casting 39, as stated, forms the base of an adapter for connecting the front axle 33 to the propelling unit of the motor grader, and the adapter further includes a plate metal section comprising side plates 50 and 52, and a top plate 53. The side plate 52 at the right side of the adapter extends in a vertical plane diverging rearwardly from the mentioned vertical plane through the common axis of the pivot pins 40 and 44, as shown in Fig. 2, and the plate has a forward horizontal edge portion contacting the bottom portion of the casting 39 in advance of the side wall 49, as shown in Fig. 1. An arcuate lower edge portion of the plate 52 conforming with the curvature of the top edge of the side wall 49 extends upwardly and rearwardly from the forward horizontal edge portion of the plate 52, and merges with another horizontal lower edge portion at the rear end of the plate 52. A welded seam along the forward horizontal edge portion and along the upwardly and rearwardly curved edge portion connects the plate 52 to the casting 39. The top edge of the plate 52 extends upwardly and rearwardly from the forward horizontal bottom edge portion on a curve approximately parallel to the curvature of the bottom edge, and the curved top edge portion merges with a straight horizontal edge portion parallel to the lower horizontal edge portion at the rear of the plate 52. A straight vertical rear edge of the plate 52 is spaced a short distance from the front face of the side channel 12. The side plate 50 at the left side of the tractor is an exact duplicate of the plate 52, and it extends in a vertical plane diverging rearwardly from the central vertical plane through the pivot pins 40 and 44 at the same angle, but in the opposite direction, as the plate 52. Like the plate 52, the plate 50 is welded to the base casting 39 of the adapter. The top plate 53 of the plate metal section has rearwardly diverging side edges extending along the top edges of the side plates 50 and 52 and the top plate is bent to conform with the curvature of the top edges of the side plates. A rearward portion of the top plate 53 extends rearwardly beyond the rear edges of the side plates 50 and 52, and projects over the top flanges of the side channels 10 and 12, as shown in Figs. 1 and 2, the side edges of said rearward portion being parallel to each other, and the rear edge 53' of the top plate being forwardly recessed as shown in Fig. 2. The top plate 53 is secured to both side plates 50 and 52 by welded seams along its side edges, as indicated in Fig. 5.

Secured to the rear of the plate section 50, 52 and 53, and also forming part of the adapter, is a filler block 54 which extends rearwardly from the side plates 50 and 52 into the space between the side channels 10 and 12 for the purpose of connecting the adapter to the side channels of the propelling unit of the grader. The filler block 54 is constructed in the form of a hollow casting which has a forward, transversely tapered portion between the rear portions of the side plates 50 and 52, the forward transversely tapered portion of the filler block being best shown in Fig. 6. As shown in this figure, the filler block has a pair of side walls 51 the forward portions of which converge towards each other, and the rearward portions of which extend parallel to each other. The side walls 51 are connected at their forward ends by a vertical transverse front wall 56, and a vertical rear wall 65 extends transversely between the parallel rear portions of the side walls 51. The side walls 51, front wall 56 and rear wall 65 are connected by a top wall 61 and by a bottom wall 66, as shown in Figs. 4 and 7. The transverse taper of the forward portion of the filler block conforms with the angle at which the side plates 50 and 52 converge forwardly towards each other, as explained hereinbefore; and welded seams along the horizontal upper and lower edges of said forward tapered portion of the filler block, and welded seams along its vertical forward edges, adjacent to the inner surfaces of the side plates 50 and 52 secure the filler block to the plate section of the adapter.

The rear part of the filler block which is disposed between the side channels 10 and 12 has side portions at opposite sides of the mentioned vertical plane through the axis of the pivot pins 40 and 44, rearwardly of and above the front axle 33, which side portions fit closely between the upper and lower machined surfaces 29 and 30 of the side channels 10 and 12, and the rearward side portions of the filler block have vertical surfaces, at opposite sides of the mentioned vertical plane, which vertical surfaces are spaced from each other transversely of the machine, substantially the same distance as the inner surfaces of the webs of the side channels, so that the rear part of the filler block may be slid between the side channels without appreciable lateral play, and so that, on the other hand, the side channels do not have to be spread laterally to an undesirable extent in order to receive the rear part of the filler block between them. Referring to Figs. 6, 7 and 8, it will be noted that an upper strap-like boss 55 is formed along the top of the filler block at the portion thereof which is received between the top and bottom flanges of the side channel 12, and a similar strap-like boss 57 is formed along the bottom of the filler block opposite to the strap-like boss 55. The bosses 55 and 57 have machined horizontal top and bottom surfaces, respectively, which are vertically spaced from each other substantially the same distance as the machined surfaces 29 and 30 of the top and bottom flanges of the side channel 12 to insure a close vertical fit of the right side portion of the rear part of the filler block between the top and bottom flanges of the side channel 12. The left side portion of the rear part of the filler block is similarly fitted between the top and bottom flanges of the left side channel 10, that is, strap-like bosses 58 and 59 (Fig. 4) are formed along the top and bottom, respectively, of the filler block at the portion thereof which is received between the top and bottom flanges of the side channel 10, the bosses 58 and 59 having machined horizontal top and bottom surfaces which are vertically spaced from each other substantially the same distance as the machined inner surfaces of the top and bottom flanges of the channel 10.

A pair of strap-like side bosses 60 and 62 are formed along the vertical side wall 51 of the right side portion at the rear part of the filler block, as shown in Figs. 7 and 8, these side bosses having coplanar vertical outer surfaces, machined for contact with the inner surface of the web of the right side channel 12. The lower side boss 62 extends somewhat farther to the rear than the upper side boss 60, the right side portion of the filler block having a rearwardly extending vertically disposed and rearwardly tapering wing 63 which forms a continuation of the right side wall of the filler block and the side boss 62 continues rearwardly at the outer side of the wing 63. A horizontal web 64 braces the wing 63 against the transverse rear wall 65 of the filler block, as shown in Fig. 6. A wing 67 similar to the wing 63 extends rearwardly from the filler block at the left side of the latter, the wing 67 being braced against the rear wall 65 by a horizontal web 68, as shown in Fig. 6. Strap-like side bosses 69 and 70 (Fig. 4), corresponding to the side bosses 60 and 62, are formed along the left side wall 51 at the left rear portion of the filler block, and the side bosses 69 and 70 have coplanar vertical outer surfaces machined for contact with the inner surface of the web of the left side channel 10.

The filler block 54 is retained against displacement longitudinally of the side channels 10 and 12 by two sets of bolts, one set at each side of the machine, which bolts extend transversely through the webs of the channels 10 and 12 and into lateral holes of the filler block. The set of bolts at the left side of the machine comprises four cap screws 72 (Figs. 8 and 12) which extend through the four holes 32 (Fig. 11) of the left side channel 10 and into registering tapped holes 73 (Fig. 6) in the upper and lower side bosses 69 and 70 at the left side of the filler block, and one bolt 74 which extends through a hole 75 in the web of the side channel 10 and through a registering plain hole 77 of the wing 67. Screwed upon the threaded inner end of the bolt 74 is a nut, as shown in Fig. 12, which is drawn up against the inner surface of the wing 67 to secure the wing 67 and the side channel 10 together. The set of bolts at the right side of the machine comprises four cap screws 78 (Fig. 1), corresponding to the cap screws 72, which extend through holes (corresponding to the holes 32) in the left side channel 10 and into registering tapped holes 79 (Fig. 7) of the side bosses 60 and 62; and a bolt (corresponding to the bolt 74) which extends through the web of the right side channel 12 and through a plain hole 77 in the wing 63, a nut on the bolt (not shown) being drawn up against the inner surface of the wing 63, to secure said wing and the side channel 12 together. The top plate 53 of the adapter, as stated, extends rearwardly over the forward portions of the side channels 10 and 12, and four bolts 80, shown in Fig. 2, extend through slotted holes in the top plate 53 and are screwed into tapped holes of the top flanges of the side channels to hold the top plate down on the side channels. The two bolts 80 at the left side of the machine are screwed into tapped holes 82 of the left side channel 10, shown in Figs. 10 and 11, and the two bolts 80 at the right side of the machine are screwed into corresponding holes of the right side channel 12.

It will be noted that the filler block 54 engages the same mounting surfaces of the side channels 10 and 12 which in the standard tractor are engaged by the steering truck, and that the cap screws 72 and 78 extend through the same holes in the side channels which in the standard tractor receive cap screws for securing the steering truck to the side channels. The filler block, being an integral casting of substantial strength and being firmly secured to the side channels, serves as a reinforcement similar to the reinforcements afforded by the flywheel and clutch housing 18 and by the transverse portion of the rear axle structure which extends across the rear ends of the side channels, so that the side channels will be able to effectively withstand the substantial forces to which they are subjected in operation of the grader.

As shown in Fig. 1, an extension shaft 83 is rotatably mounted on the adapter in alinement with the crankshaft 27 of the engine. The extension shaft passes through a bushing 84 which, as more clearly shown in Fig. 9, is secured in an aperture of the top plate 53 of the adapter, the bushing being held in place by a welded seam between its outer surface and adjacent surface portions of the plate 53. A collar 85 secured to the extension shaft 83 is fitted in a bore of the bushing 84 for rotation therein and axial displacement relative thereto, so that the shaft 83 while being supported on the plate 53 may be rotated about its axis and also shifted axially a short distance back and forth. The shaft 83 extends rearwardly through the filler block 54 and has a rear portion for coupling engagement with the forward end of the crank shaft 27, such coupling engagement being effected in the manner of a starting crank by pushing the extension shaft back and at the same time rotating it in clockwise direction. The front wall 56 of the filler block has a hole 56' and the rear wall 65 has a hole 65', as shown in Fig. 6, which holes are alined with the axis of the bushing 84. The extension shaft 83 passes through the holes 56' and 65' and is rotatably and slidably supported on the rear wall 65 by means of a bushing in the hole 65'. A coil spring 86 abutting the front wall 56 of the filler block and a collar on the shaft 83, normally retains the shaft 83 out of coupling engagement with the crankshaft 27, forward axial movement of shaft 83 being limited by a suitable stop, for instance, by a cotter pin which passes through the shaft 83 rearwardly of the rear wall 65 of the filler block. In order to crank the engine, a crank (not shown) is placed on the forward end of the extension shaft, where it may be rotated without interference with the adapter.

The alined holes in the adapter which accommodates the extension shaft may also be used to accommodate a front power takeoff shaft, as shown in Fig. 12, for driving auxiliary equipment, for instance, a rotary broom which may be mounted on the machine. The modified construction shown in Fig. 12 comprises a power takeoff shaft 87, an antifriction bearing assembly for the power takeoff shaft mounted in the bushing 84, and a driving connection 88 between the crankshaft 27 and the power takeoff shaft 87. The antifriction bearing assembly comprises a sleeve 89 which extends through the bushing 84 and has a rearwardly tapering forward portion engaging a conical seat at the forward end of the bushing 84. A nut 90 having a forwardly tapering conical portion is screwed upon the rear end of the sleeve 89 and engages a conical seat at the rear end of the bushing 84, the nut being drawn up tight to hold the sleeve 84 in fixed position. A ball bearing 92 is mounted in the sleeve 89 and supports the shaft for rotation about its axis, the shaft extending freely through the holes 56' and 65' of the filler block and being supported at its rear end on the crankshaft 27 by the driving connection 88.

For purposes of transmitting steering movement to the front wheels 34 and 35 a steering gear mechanism is mounted on the base casting 39 of the adapter, the construction of the steering gear mechanism being as follows. As best shown in Fig. 5, a steering gear housing 93 is mounted on the bottom wall of the casting 39 between the upwardly diverging side walls 48 and 49 thereof, the steering gear housing 93 being shown in section longitudinally of the machine in Fig. 12, and a horizontal section of the housing 93 being shown in Fig. 3. Referring to Fig. 12, it will be seen that the steering gear housing 93 rises from the horizontal and relatively narrow bottom portion of the casting 39 into a space between the forwardly converging side walls and below the top wall 53 of the adapter. For purposes of definition each side wall may be considered as comprising the forward wing portion, that is, the part laterally of the steering gear housing 93, which merges with and rises from the bottom portion of the casting 39, the wing portion of the right side wall including part of the plate 52, and the wing portion of the left side wall including part of the plate 50; and a rearward extension of an upper part of said wing portion, that is, the part of the side wall laterally of the filler block 54. An opening between the rear edges of the walls 48 and 49 affords access to the interior space of the adapter in which the steering gear housing 93 is mounted. The housing 93 has a lower cylindrical end portion which is fitted into the casting 39, a hole receiving the cylindrical end portion of the housing 93 being drilled into the bottom wall of the casting 39 a substantial distance rearwardly of the depending lugs 42 and a relatively short distance forwardly of the depending lugs 43. A flange of the housing 93 is bolted to the bottom wall of the casting 39 by means of two bolts 93' (Fig. 5) to retain the housing in fixed position. A steering shaft 94 is mounted in the housing 93 for rotation about a vertical axis, the shaft 94 projecting from the housing below the bottom wall of the casting 39 and extending upwardly into a gear compartment formed by an enlarged upper portion of the housing 93. Detachably secured to the downwardly projecting end of the steering shaft 94 is a steering arm 95 which extends at right angles to the axis of the steering shaft and carries at its outer end a ball element 97 for connection with a reach rod 98 best shown in Fig. 3. The reach rod is universally connected at one end with the arm 95 by means of the ball element 97 and at its other end the reach rod has another universal connection with the free end of a rearwardly extending arm of the left steering knuckle 37. A tie rod 99 connects the left steering knuckle 37 with the right steering knuckle 38 so that the steering knuckles will swing in unison when the arm 95 is moved horizontally by rotation of the steering shaft 94.

The upper end of the steering shaft 94 is upset to form a laterally extending fork which carries a threaded roller 100, the roller being rotatable on the shaft 94 about a horizontal axis which is laterally offset from the vertical axis of the shaft 94. The roller 100 cooperates with an hourglass worm 102 which is keyed to a worm shaft 103 mounted in the housing 93 for rotation about a horizontal axis extending longitudinally of the machine at the left side of steering shaft 94, as shown in Fig. 3. The rear end of the worm shaft 103 projects rearwardly from the housing 93 through a rearward aperture of the casting 39 for connection with an operating shaft 104 shown in Fig. 1. The operating shaft 104 has a universal connection with the rear end of the worm shaft 103 and extends rearwardly and upwardly therefrom in a lateral direction towards the right side of the machine into the space between the side channels 10 and 12 of the tractor where it is connected with the forward end of a steering column 105 which is mounted on the propelling unit as part of the standard tractor. The steering column has a universal connection at its forward end with the rear end of the operating shaft, and a hand wheel 107 is mounted on the rear end of the steering column within reach from a driver's seat 108 in the usual manner. A bearing 109 secured to the inner side of the right side channel 12 supports the operating shaft in its upwardly and laterally inclined position, and it will be noted that the operating shaft extends in close proximity to the bottom wall 66 of the filler block 54. In order to provide proper clearance for the operating shaft 104 the bottom wall 66 of the filler block is slightly indented as shown at 66' in Figs. 4 and 6.

The construction of the steering mechanism is such that during straight ahead travel of the machine the steering arm 95 extends forwardly from the steering shaft 94 in the mentioned vertical plane through the common axis of the pivot pins 40 and 44, the center of the ball element 97 coinciding in said position of the steering arm with said plane and being also located in close proximity to the axis of the pivot pins 40 and 44. The front axle 33 may therefore rock about the axis of the pivot pins 40 and 44 without appreciably disturbing the steering position of the front wheels 34 and 35. It will further be noted that the vertical steering shaft 104 and the front axle 33 are mounted on a common rigid support afforded by the base casting 39 of the adapter, and that perfect alinement of the entire steering mechanism may therefore easily be insured and definitely maintained. In order to steer the machine to the right the hand wheel 107 is turned to the right, and the hourglass worm 102, which is threaded right hand, cooperates with the roller 100 to pull the roller back and therefore turn the steering shaft 94 in anti-clockwise direction with reference to Fig. 3. As a result, the steering arm 95 is swung to the left and the front wheels 34 and 35 are swung to the right as will be understood without further explanation. Rotation of the hand wheel 107 to the left similarly causes steering movement of the front wheels 34 and 35 to the left.

It will be noted that the steering gear housing 93 is mounted within the base casting 39 at the lower end of the adapter which forms a walled front support of the elevated frame structure of the tractor, and that the relatively weak housing 93 which forms a shaft support for the steering gear is well protected, due to its location within the adapter, against injury during operation of the machine. Another advantage of the disclosed steering gear arrangement is the comparatively short length of the steering shaft 94, which enables said shaft to withstand the torsional strains to which it is subjected in operation, practically without twisting.

The disclosed arrangement of the steering mechanism, moreover, lends itself for ready installation of the steering gear unit comprising the housing 93 and enclosed mechanism on the machine and its removal therefrom. In order to remove the steering gear unit from the machine, it is only necessary to disconnect the steering arm 95 from the steering shaft 94, to disconnect the operating shaft 104 from the worm shaft 103, and to unscrew the bolts 93' which retain the housing 93 on the bottom casting 39. The steering gear unit comprising the housing 93, the steering shaft 94, worm shaft 103, and the gears within the housing 93, may then be lifted, in assembled condition, from the bottom of the casting 39 a sufficient distance to withdraw the lower cylindrical end portion of the housing 93 from its hole in the bottom of the casting 39, and the whole steering gear unit may then be moved rearwardly out of the casting through the rearward opening thereof between the inclined side walls 48 and 49 of the casting 39. The mentioned rearward opening of the casting 39 is arranged at the lower end of the adapter, as may be seen from Figs. 4 and 12, and affords convenient access to the interior of the adapter for the purpose of removing the steering gear unit therefrom in assembled condition. Likewise, the steering gear unit may be moved, in assembled condition, through said rearward opening of the adapter for the purpose of installing it within the adapter, as will be clear without further description in view of the foregoing explanations.

Referring now to the subframe of the grader which carries the earth working tool, the following is to be noted. As best shown in Fig. 12, a spherical socket for the reception of a ball element 110 is formed at the rear end of the base casting 39 of the adapter, a semispherical recess being formed above the rearmost lug 43 and surrounded by a suitable flange portion to which a cap 112 supplementing the semispherical recess is secured by bolts 113. The ball 110 has a shank which is mounted in a block 114 at the forward end of the drawbar 115 of the grader. As shown in Fig. 2, the drawbar comprises two side members 117 and 118 which are secured at their forward ends to the block 114 in close proximity to each other and diverge rearwardly therefrom to form a forward tapered portion of the drawbar. Continuing rearwardly from the forward tapered portion, the left side member 117 is curved on an arc about a center 119 on the right side member 118, and the right side member 118 is curved on an arc about a center 120 on the left side member. The rear ends of the side members 117 and 118, which project into the space between the rear wheels 7 and 8 of the propelling unit, are spaced transversely from each other and are rigidly connected by a transverse angle iron 122. An angle iron brace 123 extends transversely between the side members 117 and 118 approximately at the middle of the arcuate portions thereof, and a tubular brace 124 extends between the arcuate portions of the side members adjacent to the forward tapered portion of the drawbar.

A grader blade 125 underlying the propelling unit in advance of the rear traction wheels 7 and 8 has a pair of upstanding brackets 127 and 128, for connection with the side members 117 and 118 of the drawbar. Each of these brackets has a horizontal top portion with a vertical hole in it, and the spacing of these holes longitudinally of the blade is equal to the spacing of the center 119 from the center 120. The side members 117 and 118 have holes at the centers 119 and 120, respectively, and a pair of bolts extend through these holes and through the holes in the brackets 127 and 128 to secure the grader blade to the drawbar 115 in the position in which the blade is shown in Fig. 2. In order to adjust the grader blade to an angular position for discharging the scraped material at the right side of the machine, the bolt at 120 is withdrawn whereupon the blade may be rotated about the bolt at 119 so as to register the hole in the bracket 127 with any one of a series of holes 129 which are formed in the side member 117 on an arc about the center 119. The fastening bolt may then be reinserted to secure the blade in the selected angular position. In Fig. 2 the blade is shown in dash-dotted lines in the extreme angular position to which it may be adjusted for discharging dirt at the right side of the machine. The blade may similarly be adjusted for discharging the scraped material at the left side of the machine by rotating it about the center 120 and selecting any one of a series of holes 130 in the side member 118 for securing the blade in an angularly adjusted position. The mounting of the blade on the drawbar 115 and the mentioned angular adjustment thereof are more fully disclosed, and claimed, in U. S. Patent 2,239,649, April 22, 1941, C. P. Leliter, Road working machine.

The rear end of the drawbar 115 is adjustably suspended from the propelling unit by means of a lift mechanism which is mounted on the side channels 10 and 12 forwardly of the rear axle structure and in rear of the transmission housing 24. A bracket 132 has a transverse bottom portion extending across the side channels 10 and 12 to which it is secured in any suitable manner, and rising upwardly from the bottom portion, at opposite sides of the propelling unit, the bracket 132 has two arms on the upper ends of which are mounted hand wheels 133 and 134. The hand wheel 134 at the right side of the machine is operatively connected by a suitable worm and gear mechanism with a lifting arm 135 which is pivotally mounted on the bracket 132 for swinging movement in a vertical plane transversely of the machine. A lifting link 137 connects the free end of the lifting arm 135 with the rear end of the side member 118 of the drawbar at the outer side of the side channel 12. The hand wheel 133 at the left side of the machine is operable in a similar manner to raise and lower the left side of the drawbar 115. The hand wheel 133 is operatively connected by a worm and gear mechanism with a lifting arm 138 which is pivoted on the bracket 132, and a lifting link 139 connects the free end of the lifting arm 138 with the rear end of the side member 117 of the drawbar at the outer side of the side channel 10. The hand wheels 133 and 134 may be rotated simultaneously to raise and lower the drawbar about its forward universal connection with the base 39 of the adapter, or they may be rotated individually to tilt the drawbar laterally relative to the propelling unit. A link 140 is pivotally connected at one end to a lug 142 depending, at the left side of the propelling unit, from a crossbar 143 which is secured to the propelling unit in a transverse position below the side channels 10 and 12, and the other end of the link 140 is pivotally connected with the rear angle iron 122 of the drawbar 115 in proximity to the rear end of the right side member 118. The link 140 serves to prevent the drawbar 115 from swinging laterally about its pivot connection with the base 39 in any position of adjustment to which it may be moved by manipulation of the hand wheels 133 and 134. For a fuller disclosure of the adjusting mechanism for the drawbar comprising the hand wheels 133 and 134 and the link 140, reference is made to the mentioned U. S. Patent 2,239,649. The subframe of the grader which underlies the elevated frame structure of the tractor may be raised and lowered by manipulation of the hand wheels 133 and 134 without interference with the shafting for rotating the hourglass worm 102 of the steering gear, which shafting overlies the subframe and extends through the elevated frame structure of the tractor, as shown in Fig. 1.

It will be noted that the grader blade 125, in the full line position in which it is shown in Figs. 1 and 2, is spaced a substantial distance rearwardly from the front wheels 34 and 35, and that the blade may be moved horizontally to an angularly adjusted position, as described hereinbefore, through a relatively wide range. In the dash-dotted line position in which the blade is shown in Fig. 2 the leading end of the blade is spaced rearwardly from the left front wheel 34, and lies inside of a vertical plane through the outer edge of the wheel 34. In other words, the blade may be moved to a position in which its leading end is closer to the center of the machine than the outer side of the wheel preceding said leading end of the blade, which is a desirable feature since it facilitates operation of the machine in ditch cleaning work. In any angular position to which the blade may be adjusted the rearward spacing of the blade from the front wheels is adequate to clear all the dirt which the grader can handle, that is, the front wheels will always run a sufficient distance ahead of the roll of dirt piling up in front of the blade so that the scraped material will not interfere with the free rotation and steering movements of the front wheels.

In the full line position in which the blade is shown in Fig. 2, the forward spacing of the blade from the rear wheels 7 and 8 is relatively short, which is another desirable feature since full advantage can be taken of the weight of the propelling unit for forcing the blade down into the ground; and when the blade is placed into an angularly adjusted position for moving the scraped material either to the right or to the left side of the machine, the lateral thrust of the scraped material upon the blade will not cause the front end of the machine to veer to the side, nor will the rear end of the machine have a pronounced tendency of such lateral veering. The lateral thrust is resisted to about the same extent at both ends of the machine.

The front axle 33 is positioned a suitable distance forwardly from the front ends of the side channels 10 and 12 to afford the required space in advance of the blade, but since the blade is positioned under the propelling unit, where sufficient room is provided due to the relatively high vertical spacing of the side channels from the ground, the horizontal spacing of the front axle 33 from the forward ends of the side channels 10 and 12 is relatively short. The wheel base of the grader, that is, the longitudinal spacing between the front and rear wheels, is longer than that which is obtained by mounting the regular steering truck of the standard tractor on the propelling unit, but the increase of the wheel base is relatively small so that the grader may be maneuvered with about the same facility as the standard tractor. Another advantage of the relatively small increase of the wheel base is that it may be effected at relatively low costs. The adapter constitutes in effect an extension of the propelling unit, and since this extension is relatively short, it may not only be manufactured at relatively low costs, but it may also be secured solely to the side channels 10 and 12, without danger that the side channels become subject to undue stresses during the operation of the grader.

It should be understood that it is not intended to limit the invention to the exact details of construction herein shown and described, for various modifications may be made without departing from the scope of the appended claims.

It is claimed and desired to secure by Letters Patent:

1. In a vehicle having an elevated frame structure, a walled front support extending downwardly from said frame structure and having a bottom portion at its lower end, a front axle supportingly connected with said front support, front wheels adjustably mounted on said front axle, a shaft support movable into and out of said front support through a rearward aperture of the latter above said bottom portion thereof and below said elevated frame structure, means detachably securing said shaft support within said front support to said bottom portion of the latter, a shaft mounted on said shaft support for rotation about a vertical axis and extending through said bottom portion of said front support, gear mechanism for rotating said shaft mounted on said shaft support within said front support at the lower end of the latter, means connected with said shaft below said bottom portion of said front support and with said front wheels for adjusting the latter by rotation of said shaft, and shafting for operating said gear mechanism extending rearwardly through said rearward aperture of said front support and upwardly through said elevated frame structure.

2. In a vehicle having an elevated frame structure, a walled front support extending downwardly from said frame structure and having a bottom portion at its lower end, a front axle supportingly connected with said front support, front wheels adjustably mounted on said front axle, a shaft support movable into and out of said front support through an apertured portion of the latter adjacent to and rising from said bottom portion, detachable connecting means between said front and shaft supports securing said shaft support within said front support in a fixed position at the lower end of the latter, a shaft mounted on said shaft support for rotation about a vertical axis and extending through said bottom portion of said front support, gear mechanism for rotating said shaft mounted on said shaft support within said front support at the lower end of the latter, means connected with said shaft below said bottom portion of said front support and with said front wheels for adjusting the latter by rotation of said shaft, and shafting operatively connected with said gear mechanism for actuating the latter and extending longitudinally of said frame structure.

3. In a vehicle having an elevated frame structure, a walled front support extending downwardly from said frame structure and having an aperture affording access to the lower end of an interior space of said front support, a front axle supportingly connected with said front support, front wheels adjustably mounted on said front axle, a shaft support movable into and removable from said interior space of said front support through said aperture of the latter, detachable connecting means between said front and shaft supports securing said shaft support within said front support in a fixed position at the lower end of the latter, a rotatable shaft mounted on said shaft support and having a portion outside of said interior space of said front support, gear mechanism for rotating said shaft mounted on said shaft support within said front support at the lower end of the latter, means connected with said outer portion of said shaft and with said front wheels for adjusting the latter by rotation of said shaft, and operating means for said gear mechanism including a power transmitting element extending through said elevated frame structure.

4. In a vehicle having an elevated frame structure and a walled front support extending downwardly therefrom, a front axle supportingly connected with said front support, front wheels adjustably mounted on said front axle, and means for adjusting said front wheels comprising a gear support and gear mechanism mounted thereon, movable as an assembled unit into and out of said front support through an aperture at the lower end of the latter, detachable fastening means for securing said gear support within said front support at said lower end thereof, means operatively connecting said gear mechanism with said front wheels, and operating means for said gear mechanism including a power transmitting element detachably connected with said gear mechanism and extending through said elevated frame structure.

5. A vehicle front assembly comprising, running gear including an axle and at least one wheel adjustably mounted on said axle, a housing structure connected with said axle, having an aperture affording access to an interior space of said housing structure, and being adapted to sustain a vehicle structure connected therewith, on said axle, a shaft support movable into and out of said space through said aperture, detachable fastening means cooperating with said shaft support and housing structure to retain said shaft support in fixed position within said space, a shaft projecting into said space, rotatably mounted on said shaft support and removable from said space together with said shaft support through said aperture after detachment of said fastening means, means operatively connecting said shaft with said wheel for adjusting the latter by rotation of said shaft, and means for rotating said shaft including mechanism within said housing structure operatively connected with said shaft.

6. A vehicle front assembly comprising, running gear including an axle and at least one wheel adjustably mounted on said axle, a housing structure connected with said axle, having an aperture affording access to an interior space of said housing structure, and being adapted to sustain a vehicle structure connected therewith, on said axle, a shaft support movable into and out of said space through said aperture, detachable fastening means cooperating with said shaft support and housing structure to retain said shaft support in fixed position within said space, a shaft projecting into said space rotatably mounted on said shaft support, means for rotating said shaft including a driving element rotatably mounted on said shaft support within said space, and power transmitting means within said space drivingly connecting said driving element with said shaft, said shaft support, shaft, driving element and power transmitting means being removable as an assembled unit from said space through said aperture after detachment of said fastening means; and means operatively connecting said shaft with said wheel for adjusting the latter by rotation of said shaft.

7. A vehicle front assembly comprising, running gear including an axle and at least one wheel adjustably mounted on said axle, a housing structure connected with said axle, having an aperture affording access to an interior space of said housing structure, and being adapted to sustain a vehicle structure connected therewith, on said axle, a shaft support having a gear compartment, movable into and out of said space through said aperture, detachable fastening means cooperating with said shaft support and housing structure to retain said shaft support in fixed position within said space, a shaft journaled on said shaft support, projecting into said gear compartment, means for rotating said shaft including gear mechanism within said gear compartment, said shaft support, shaft and gear mechanism being removable, as an assembled unit, from said space through said aperture after detachment of said fastening means; and means operatively connecting said shaft with said wheel for adjusting the latter by rotation of said shaft.

8. A vehicle front assembly comprising, running gear including an axle and at least one wheel adjustably mounted on said axle, a housing structure connected with said axle and adapted to sustain a vehicle structure connected therewith, on said axle, said housing structure having top, bottom and side portions and an aperture in a portion thereof between said top and bottom portions, affording access to an interior space of said housing structure, a shaft support movable into and out of said space through said aperture, detachable fastening means cooperating with said shaft support and housing structure to retain said shaft support in fixed position within said space, a shaft mounted on said shaft support for rotation about an axis extending through said bottom portion, said shaft projecting into said space and being removable therefrom together with said shaft support through said aperture after detachment of said fastening means, means operatively connecting said shaft with said wheel for adjusting the latter by rotation of said shaft, and means for rotating said shaft including mechanism within said housing structure operatively connected with said shaft.

9. A vehicle front assembly comprising, running gear including an axle and at least one wheel adjustably mounted on said axle, a housing structure connected with said axle and adapted to sustain a vehicle structure connected therewith, on said axle, said housing structure having top, bottom and side portions and an aperture in a portion thereof between said top and bottom portions, affording access to an interior space of said housing structure, a gear casing rising from said bottom portion within said space and having a gear compartment in proximity to said bottom portion, detachable fastening means cooperating with said gear casing and with said housing structure to retain said gear casing in fixed position within said space, a shaft rotatably mounted on said gear casing, having a portion therein and extending outwardly therefrom through said bottom portion of said housing structure, means including gear mechanism within said gear casing operable to rotate said shaft, an arm detachably secured to said shaft outside of said housing structure in proximity to said bottom portion thereof, and means operatively connecting said arm with said wheel for adjusting the latter by rotation of said shaft, said gear casing, shaft and gear mechanism being removable, as an assembled unit, from said space through said aperture after detachment of said fastening means and disconnection of said arm from said shaft.

10. In a vehicle front assembly, a support comprising a bottom portion, a pair of side walls merging with and rising from said bottom portion, a filler block rigidly connected with said side walls in an elevated position relative to and rearwardly of said bottom portion, and a top wall connecting said side walls above said bottom portion; said filler block being adapted to fit between opposite side members of a vehicle frame; an axle supportingly connected with said support; at least one supporting wheel adjustably mounted on said axle; and means for adjusting said wheel including gear mechanism within the space between said side walls above said bottom portion and below said top wall, and shafting for operating said gear mechanism extending rearwardly from said space and under said filler block.

11. In a vehicle front assembly, running gear including an axle and at least one wheel adjustably mounted on said axle; a front support comprising a substantially horizontal bottom portion, a pair of forwardly converging side walls each having a forward wing portion merging with and rising from said bottom portion and a rearward extension of the upper part of said wing portion, and a top wall connecting said side walls; means swingably connecting said axle to said bottom portion of said front support; a shaft extending through said bottom portion of said front support into the space between said wing portions; means operatively connecting said shaft with said wheel for adjusting the latter by rotation of said shaft; gear mechanism within said space between said wing portions operatively connected with said shaft and operable to rotate said shaft; and operating means for said gear mechanism including shafting extending rearwardly from said space between said wing portions at a level below said rearward extensions thereof.

HORACE W. LINDSAY.